(12) United States Patent
Wintergerst et al.

(10) Patent No.: US 7,725,771 B2
(45) Date of Patent: May 25, 2010

(54) METHOD AND SYSTEM FOR PROVIDING ENHANCED MEMORY ERROR MESSAGES

(75) Inventors: Michael Wintergerst, Rauenberg (DE); Ralf Schmelter, Wiesloch (DE); Arno Zeller, Mannheim (DE); Jan Boris Dostert, Nussloch (DE)

(73) Assignee: SAP AG, Walldorf (DE)

( * ) Notice: Subject to any disclaimer, the term of this patent is extended or adjusted under 35 U.S.C. 154(b) by 711 days.

(21) Appl. No.: 11/648,299

(22) Filed: Dec. 29, 2006

(65) Prior Publication Data

US 2008/0163009 A1   Jul. 3, 2008

(51) Int. Cl.
*G06F 11/00* (2006.01)

(52) U.S. Cl. ......................................... 714/38

(58) Field of Classification Search ........................ None
See application file for complete search history.

(56) References Cited

U.S. PATENT DOCUMENTS

| | | | |
|---|---|---|---|
| 7,552,153 B2* | 6/2009 | Dostert et al. | 707/206 |
| 2006/0136530 A1* | 6/2006 | Rossmann | 707/206 |
| 2007/0255774 A1* | 11/2007 | Topchiyski | 707/206 |
| 2007/0255775 A1* | 11/2007 | Manolov et al. | 707/206 |

* cited by examiner

*Primary Examiner*—Michael C Maskulinski
(74) *Attorney, Agent, or Firm*—Blakely, Sokoloff, Taylor & Zafman LLP

(57) ABSTRACT

A system and method are provided to provide an enhanced memory error message. In one embodiment, a first message is associated to a memory error occurring at a virtual machine, the first message indicating the memory error has occurred. A second message is associated to the memory error when the memory error has occurred, the second message explaining the memory error. The memory error having the first message and the second message is thrown.

18 Claims, 6 Drawing Sheets

METHOD AND SYSTEM FOR PROVIDING ENHANCED MEMORY ERROR MESSAGES

FIELD

Embodiments of the invention relate generally to the field of data processing systems. More particularly, the embodiments of the invention relate to provide enhanced memory error messages.

BACKGROUND

A memory on any computing system is a limited resource. No matter how fast computing systems become, they always depend upon a finite amount of memory in which to run their software applications. As a result, software developers should consider this resource when writing and developing software applications.

The Java programming language differs from many traditional programming languages (e.g., C, C++, C#) by the way in which memory is allocated and deallocated. In languages like C, C++ and C#, memory is explicitly allocated and deallocated by the application programmer/developer. This can greatly increase the time spent by programmers in tracking down coding defects in regards to deallocating memory.

By contrast, the Java runtime environment (e.g., Java virtual machine) provides a built-in mechanism for allocating and deallocating memory. In Java, memory is allocated to objects. The Java virtual machine ("VM" or "JVM") automatically handles the amount and allocation of memory upon an object's creation. The Java runtime environment employs a "garbage collector" (GC) to reclaim the memory allocated to an object that is no longer needed. Once the GC determines that the object is no longer accessible (e.g., when there is no longer any references to it stored in any variables, the fields of objects, or the elements of any arrays, etc.), it reclaims the allocated memory. When objects in a Java application are no longer referenced, the heap space the object occupied is to be recycled so that the space becomes available for subsequently-created objects.

Although having garbage collection improves productivity, it is not entirely immune from a class of bugs, called "memory leaks." A memory leak can occur when a program (or in the case of Java, the VM) allocates memory to an object but never (or only partially) deallocates the memory when the object is no longer needed. As a result, a continually increasing block of memory may be allocated to the object, eventually resulting in an "Out Of Memory Error" (OOME). In other words, a memory leak occurs when memory is allocated, but it is never (or only partially) reclaimed. Memory leaks can also occur when a data structure (e.g., hashtable) is used to associated one object with another and even when neither object is required any longer, the association with the data structure remains, preventing the objects from being reclaims until the data structure is reclaimed. Stated differently, when a lifetime of the data structure is longer than that of the objects associated with it, memory leaks are caused.

Memory leaks are of particular concern on Java-based systems (e.g., Java 2 Platform Enterprise Edition (J2EE) platforms) which are to run twenty-four hours a day, seven days a week. In this case, memory leaks, even seemingly insignificant ones, can become a major problem. Even the smallest memory leak in code that runs 24/7 may eventually cause an OOME, which can bring down the VM and its applications.

Knowing how to track down memory leaks is essential to having a solid program design. There are many performance and/or debugging tools that are used to monitor and examine software applications to determine resource consumption within the Java runtime environment. For example, a profiling tool may identify the most frequently executed methods and objects created in an application. Another type of software performance and debugging tool is a "tracer." However, such tools are very limited in detection of memory leaks, while consuming great amounts of system resources by requiring starting and restarting of VMs in special modes. Further, such tools are also limited in providing information on how the memory leaks occur. This leaves developers with often insurmountable amounts of code to manually evaluate to find the specific class and method calls, etc. Moreover, although these tools may provide certain statistics on the memory allocation for objects within a running application, such information may not be useful for an application that comprises several thousand objects.

Conventional profiling tools (e.g., Optimizelt and JProbe), when used, require restarting of VMs and the server, which results in loss of production and system resources, particularly when restarting a productive system. Moreover, the starting of the server and its VMs further adds to the system overhead by increasing memory consumption, which also harms the normal work of the server and server software. The restarting of the server adds overhead in regards to the Central Processing Unit (CPU), as the server would have to start up from scratch. The memory consumption should be the same (when the server is shut down, the memory is freed, when it starts up, it's allocated again). These profiling tools require additional memory to operate. Furthermore, these tools require manual interaction with regard to the functioning of the GC, which is not only tedious in nature, but also results in loss of previously-collected profiling information each time an OOME occurs.

SUMMARY

A system and method are provided to provide an enhanced memory error message. In one embodiment, a first message is associated to a memory error occurring at a virtual machine, the first message indicating the memory error has occurred. A second message is associated to the memory error when the memory error has occurred, the second message explaining the memory error. The memory error having the first message and the second message is thrown.

The above attributes may be implemented using a computer program, a method, a system or apparatus, or any combination of computer programs, methods, or systems. These and other details of one or more embodiments of the invention are set forth in the accompanying drawings and in the description below.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

As used herein, references to one or more "embodiments" are understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

Java applications can vary in both size and complexity. In addition, certain large Java application (e.g., ~10,000 classes and ~1,000,000 methods with ~100,000,000 method calls) may run 24/7 ("long living" applications). Within a long living application, memory leaks can become major problems in terms of both stability and performance. For example, a single long living object that increases in size by 1 byte between each GC cycle will eventually cause the application and VM to crash due to an OOME. Although such a crash may take a long time (e.g., 1 bytes per GC cycle * millions of free bytes of memory), it will inevitably occur.

For an application that contains thousands of objects and classes, merely an indication of an OOME is useless without a significant amount of manual analysis. Merely knowing that an error has occurred is one thing, but to know which object or objects may be responsible for leaking is one thing, while additional information that further explains the error and the process by which that additional information is obtained is another thing. In one embodiment, when a memory error occurs, the relevant application is not restarted and any necessary and relevant information is collected and stored so that it can be used for post-error analysis. Using this information can help save the developer from manually analyzing a large amount of data to determine where exactly in the code the leak has occurred (e.g., within which specific classfile).

Figure 1:
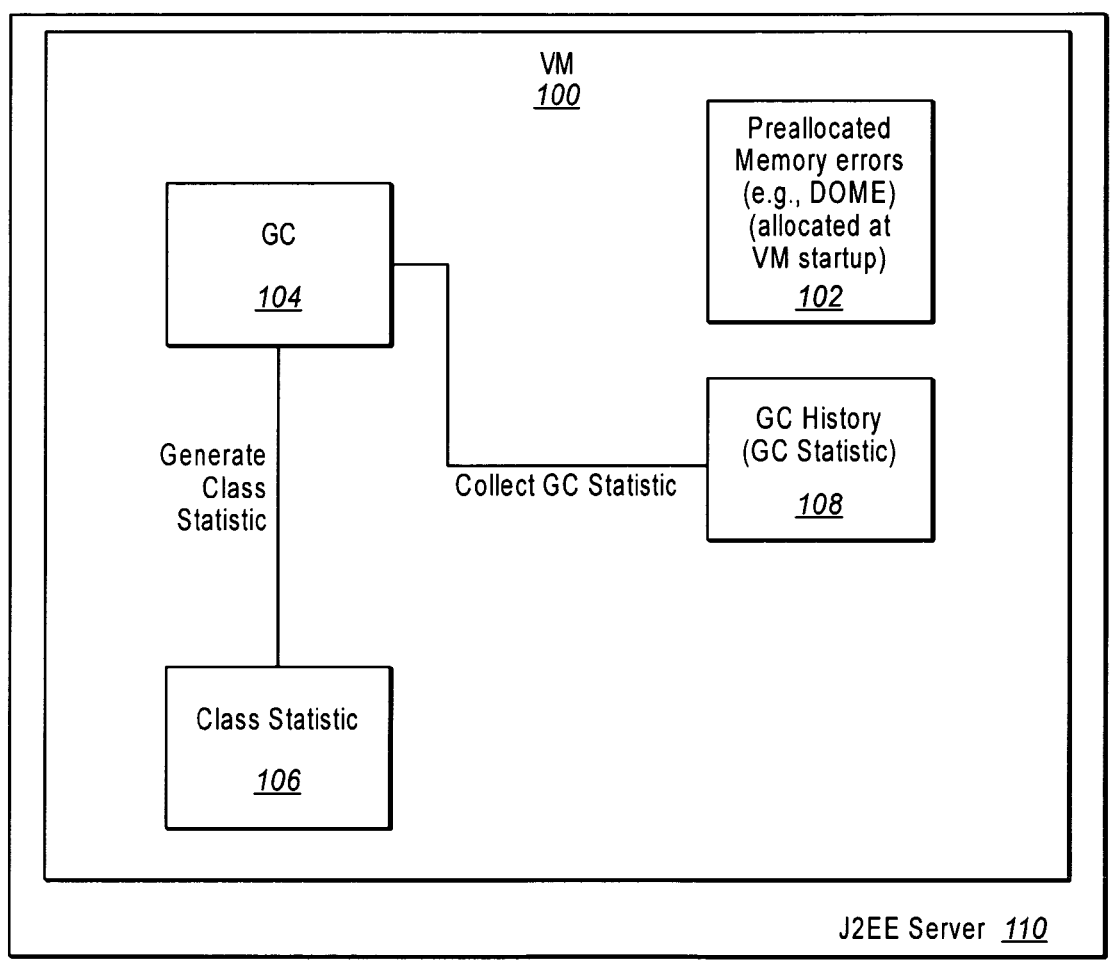
FIG. 1 illustrates an embodiment of a virtual machine employing a message enhancement mechanism for memory errors.

FIG. 1 illustrates an embodiment of a virtual machine 100 employing a message enhancement mechanism (mechanism) for memory errors. A pre-allocated memory error (e.g., OOME) 102 is provided. In one embodiment, a mechanism is provided for enhancing the pre-allocated memory message associated with the memory error 102 is provided. The illustrated mechanism includes GC 104, GC history 108, and class statistic 106 to generate extended information (having GC history 108 and class statistic 106), which is then associated with the default/pre-allocated message of the memory error 102 so that the root cause of the error 102 (e.g., <java.lang.OutOfMemory>) can be clearly and quickly identified. For example, a conventional memory error message (conventional message) includes a default message that merely provides that a memory error 102 has occurred, without providing any additional information to help with troubleshooting. In one embodiment, an enhanced memory error message (enhanced message), such as "Exception in thread 'main' java.lang.OutOfMemoryError: Java heap space (failed to allocate 1048592 bytes)", includes a detailed message that provides additional information about the memory error 102 and is associated with the conventional message of the memory error 102. The enhanced message further includes the number of bytes that were tried for allocation.

In one embodiment, the enhanced message is generated using a message enhancement mechanism having GC 104 associated with GC history 108 and class statistics 106. A dump of garbage collection GC history 108 includes a collection of GC-related statistic information (GC statistic) that summarizes the activities of GCs 104 that occur in VM 100 and indicates various events, such as whether a GC 104 was a full or partial, how long the GC 104 lasted, the number of freed bytes, etc. Furthermore, a memory usage trend for the system (e.g., whether the heap is growing slow/fast and in which timeframe, etc.) is also determined.

Additionally, class statistic 106 is provided and dumped to add extended information that is then used to create the enhanced message. Class statistic 106 summarizes those objects that are found in various generations of a Java heap. Class statistic 106 can also display the number and the cumulated size of objects in specific generations which allows for identifying of classes associated with objects that consume the most memory space. Class statistic 106 may also be used to check which classes and class loaders are still alive to track down memory leaks in a permanent generation. The Java permanent generation holds data needed by VM 100 to describe those objects that do not have an equivalence at the Java language level. For example, objects describing classes and methods are stored in the permanent generation. In one embodiment, the enhanced message is generated and associated with memory error 102 in runtime (e.g., without restarting the VM 100) and without any system overhead, so the technique remains useful even if memory errors 104 take a long time (e.g., weeks or longer) to surface. The VM 100, in the illustrated embodiment, includes a JVM and resides at a J2EE server 110.

GC statistic at GC history 108 provides a detailed output of GC 104 and if the output is typically large, it can be divided into several levels to provide basic information (e.g., <-XtraceGCStatisticLevel1>, <-XtraceGCStatisticLevel2>, <-XtraceGCStatisticLevel3>), progressively more information (e.g., <-XtraceGCStatisticLevel4>), and complete information (e.g., <-XtraceGCStatisticLevel1>). GC statistic may then be written to a console or a trace file (e.g., when running the J2EE engine) in a human-readable format for a developer or administrator to evaluate. Further, GC statistic at GC history 108 (e.g., level 5 GC statistic) may be divided into two parts: the first part that summarizes the entire GC 104 and the second part that contains data relating to the various single events that make up a GC 104.

The first part of GC statistic contains summary information about the entire GC 104. Some of the entries that are not obvious may include a GC number as each GC 104 in VM 100 has a unique number, the time GC 104 started (date/time), the number of full GCs 104 that have occurred in VM 100, whether the GC 104 is full or partial, the number of GC page faults that occur when some part of the Java heap is not in the physical memory any longer, but was swapped out to disk by the operating system, and GC reasons in the GC statistic for a list of possible reasons indicating why the GC 104 was started at all, and the like. Some of the GC reasons may include explicitly requesting GC 104 (e.g., <System.gc( )>), GC 104 being forced by a JVMTI agent (e.g., <JvmtiEnv ForceGarbageCollection>), an allocation of a Java object failed, which is the most probable cause for GC 104 (e.g., <Allocation Failure>), GC 104 being forced by allocation statistic (e.g., <Allocation Statistic requested>), and GC 104 being forced to dump a class statistic (e.g., <Class Statistic requested>), and the like.

GC reasons in the GC statistic also include summary information about the overall Java heap usage changes that may have happened during GC 104. Such information includes the number of bytes used in the Java heap before and after GC 104 (e.g., <Used in Java heap before GC>) presented in human-readable form (e.g., using kB, MB, GB and the exact number of bytes in parenthesis), the number of bytes freed in the Java heap during GC 104, the number of committed bytes in the Java heap before and after GC 104 (including the Java heap for which physical memory has been allocated), and the difference between the committed bytes before and after GC 104 (e.g., where a negative number reflects the more memory is committed after the GC 104 and a positive value that less memory is committed after the GC 104). Information about the number of array and non-array Java classes includes the number of non-array and array classes before and after GC 104. Class unloading is typically performed during a full GC 104. Information is also provided regarding the GC objects that are part of young and old generations of GC 104.

The second part of GC statistic includes events and activities relating to GC 104. The process of GC 104 includes a complex chain of activities and events to allow for throwing away of dead objects and moving of the living objects together. Some of these events may include the Java program having to allocate a byte array without having enough space in the Java heap, so GC 104 is triggered, collecting of young generation first, but the collection may not make enough free space to satisfy the allocation, performing a full collection of the Java heap, and the entire Java heap is then collected. In case there is not enough space in the Java heap, a memory error (e.g., OOME) is thrown. However, first a full GC 104 is tried, clearing objects referenced by a soft reference (e.g., <SoftReference>) without having a dead space inserted during the GC 104. If this fails too, an OOME is thrown. In one embodiment, extended information is generated, which includes information relating to GC statistic from GC history 108 and class statistic 106, with regard to OOME to provide an enhanced message that includes the extended information and any conventional message relating to the OOME, when the OOME is thrown.

A single GC 104 may include several GC events and since merely the summary information of GC statistic may not include all the events, several higher levels of GC statistic may also be provided and used to represent the statistics of each of these events. These statistics having contained in GC statistic may be provided in a chronological order for the benefit of the user, such that the user can evaluate each event and know, for example, what happened when. For example, an output of GC events may provide information about the GC events in the order in which they are likely to occur. A dump of GC history 108 having GC statistic is then used to create the extended information, which as described earlier, is associated with any conventional memory error message to generate the enhanced message.

In one embodiment, class statistic 106 is used to summarize any objects found in various generations of the Java heap. Class statistic 106 is used to display a number and cumulated size of the objects in specific generations, which allows for an easy identification of those classes that objects consume the most space. Further, class statistic 106 is used to check which classes and class loaders are still alive, to track down any memory leaks in the permanent generation. Class statistic 106 is written to a console or a trace file (e.g., when running the J2EE engine) to be displayed to the user in a human-readable format. Class statistic 106 can be obtained via a socket or by storing it in a file in binary format for later analysis.

A basic form of class statistic 106 is enabled via a flag (e.g., <-XtraceClassStatistic>). If the flag is turned on, the basic form of class statistic 106 is written on each of the full GC 104. This can be broken up into three parts. Regarding the first part of the basic form of class statistic 106, classes are sorted by the overall number of bytes they consume in the young and old generations (while the class statistic 106 of the permanent generation follows in the second part). Since there can be several classes with the same name, but they can be loaded by different class loaders, the class loader identification is also shown, for example, to the left of each class name. The class loader identification is unique for each class loader that is encountered in VM 100. Also, the identification of a shared class loader is the same for each VM 100 which uses that class loader. After the list of classes follows the summary of classes. For example, the strings may make up nearly 40% of the heap, followed by bytes arrays, and objects used for hash maps. Furthermore, it can be seen that byte arrays are large on average (e.g., 800 bytes for instance), while the character arrays are not that large on average (e.g., 135 bytes, which is about 60 characters). In one embodiment, class statistic 106 contains merely the live objects in generations and since they are collected during GC 104, the objects that are alive and those that are not alive are known, which provides a fairly accurate picture of what objects are really used. Class statistic 106 may also provide the size of the non-array objects by merely dividing the overall size of the objects by the number of objects.

The second part of the basic form of class statistic 106 provides class statistics for that permanent generation that include the number of objects, size in bytes, and class names. For example, the second part, in explaining the objects, may show that character arrays are interesting and important as they may take up about 20% of the space and are used for interned strings. The third part of the basic form of class statistics 106 provides a list of class loaders that are still living, indicating the number of classes, the number of metadata, the size of metadata, and class loader names (if the class loaders have names). A shared class loader typically has a name since a name is to be supplied when the class loader is created. For example, a shared class loader is presented in a class statistic table for class statistic 106 as "/L_sap.com#com.sap.xi.repository#0", while the class loader name for the class loader is the part between "/L_" and "#". Since there could be more than one shared class loader with the same name, the version of the class loader is appended after the "#". If the class loader is not a shared class loader, simply the name of the class loader's class is provided.

A special class loader includes a bootstrap class loader, which is denoted by, for example, "<bootstrap>". The bootstrap class loader is used to load various Java Development Kit (JDK) classes, such as java.lang.Integer. The class loader identification is provided via class statistic 106 to allow a mapping between the class loader identifications given in the first part of the basic form of class statistic 106 and the class loader name. The number of classes, which is also provided via class statistic 106, is defined by a class loader. It is possible that a class loader has defined classes for which an instance cannot be found in the first part of class statistic 106, since not every loaded class has a living instance. Now referring to the names of metadata, the metadata of a class are the internal objects which can be attributed to that class. For a normal class, such as java.lang.String, these are regarded as their instance class, the associated constant pool and constant pool cache and the method, method data, and constant method objects of that class and all the primitive arrays to which these refer. The symbol objects might not be included and interned strings, since these might be shared between many classes. The attributed metadata may show a part of the picture, which is nevertheless, useful. The overall number of metadata objects that are attributed to the classes defined by the respective class loader is also provided via class statistic 106. Similarly, the overall size of these metadata objects is also provided via class statistic 106.

In one embodiment, class statistic 106 also includes detailed class statistics having four parts. The detailed form of class statistic 106 is enabled via a flag (e.g., <-XtraceDetailedClassStatistic>). If the flag is turned on, a detailed class statistic is to be written for each full GC 104. Since the second part of the detailed form of class statistic 106 equals the second part of the basic form of class statistic 106, and the fourth part of the detailed form of class statistic 106 equals the third part of the basic form of class statistic 106, the first and third parts of the detailed form of class statistic 106 are discussed here.

In contrast to the basic form of class statistic 106, the detailed form of class statistic 106 differentiates between objects in the young generation and the old generation of GC 104. Objects in the old generation are differentiated by their age. For example, the age of an object in an old generation is the number of times it has survived a full GC 104. The range of the ages that is provided via class statistic 106 allows the user to identify those objects that have a very long lifetime in contrast to those that do not. With regard to the third part of the detailed form of class statistic 106, the number and size of those meta-data objects associated with each class are provided. The third part of the detailed form also includes many more classes than those provided in the first part of the detailed form, because not every loaded class has to have a living instance (e.g., usually less than 50% have). Although the size of the metadata of a class might not be as critical (since their size is about proportional to the size of the source code of the class), using an Integrated Development Environment (IDE), it is much easier to create a lot of code, so classes with suspiciously large metadata associated to it are determined. The third part of the detailed form also provides the number of metadata, the size of metadata, class loader identification, and class names. Viewing this information, the user can decipher other relevant information. For example, a large metadata might be associated with a class, such as ORBUtilSystemException, which could be part the rt.jar of the JDK and is automatically generated (e.g., its source may consist of nearly 10000 lines with hundreds of methods). Since code generators are more likely to create huge amounts of code, the size of the metadata associated with generated classes are to be checked first, since these classes are normally the ones for which there is a chance of trimming them down.

Figure 2A:
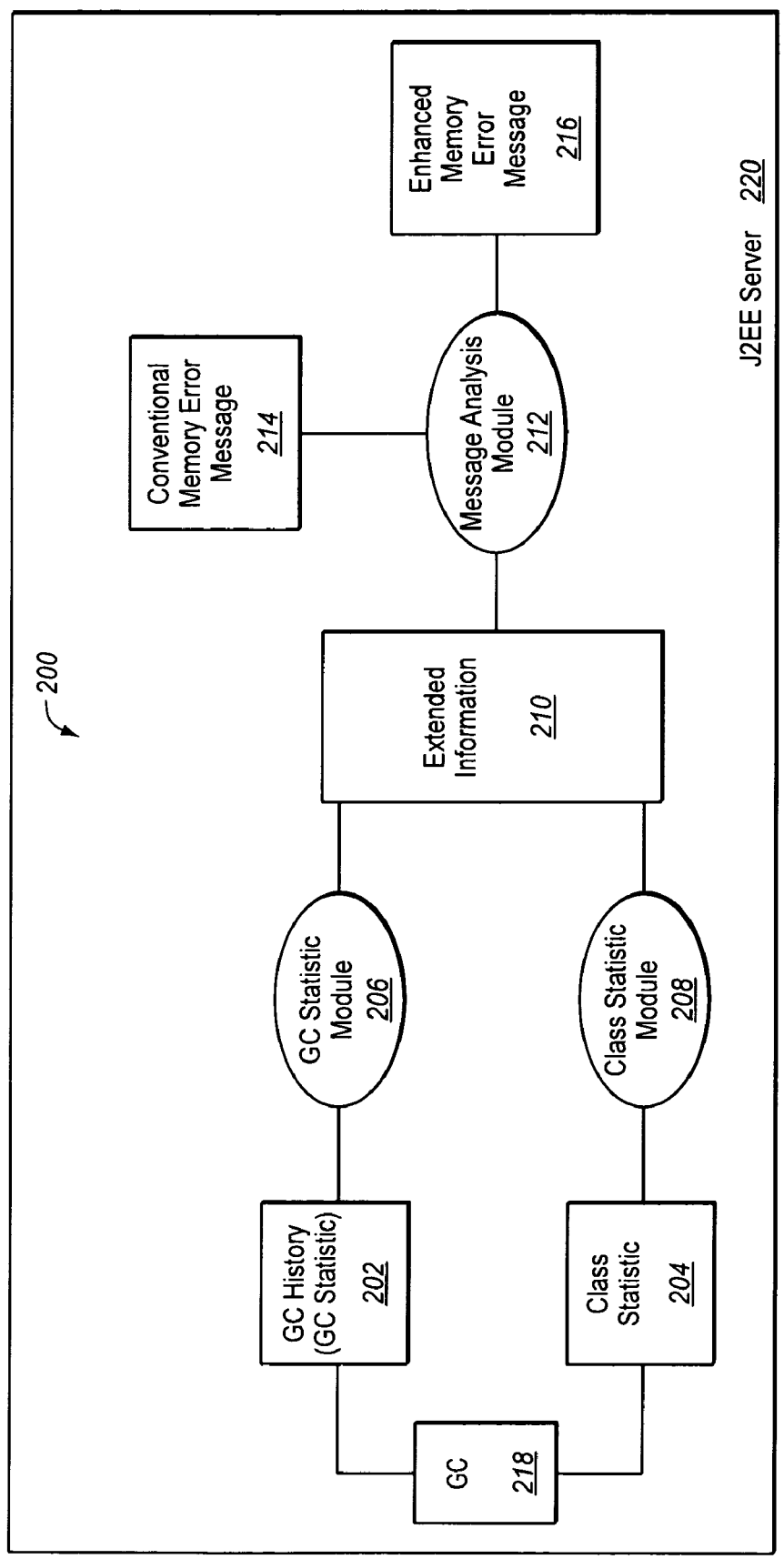
FIGS. 2A-2B illustrate an embodiment of a message enhancement mechanism for memory errors.
Figure 2B:
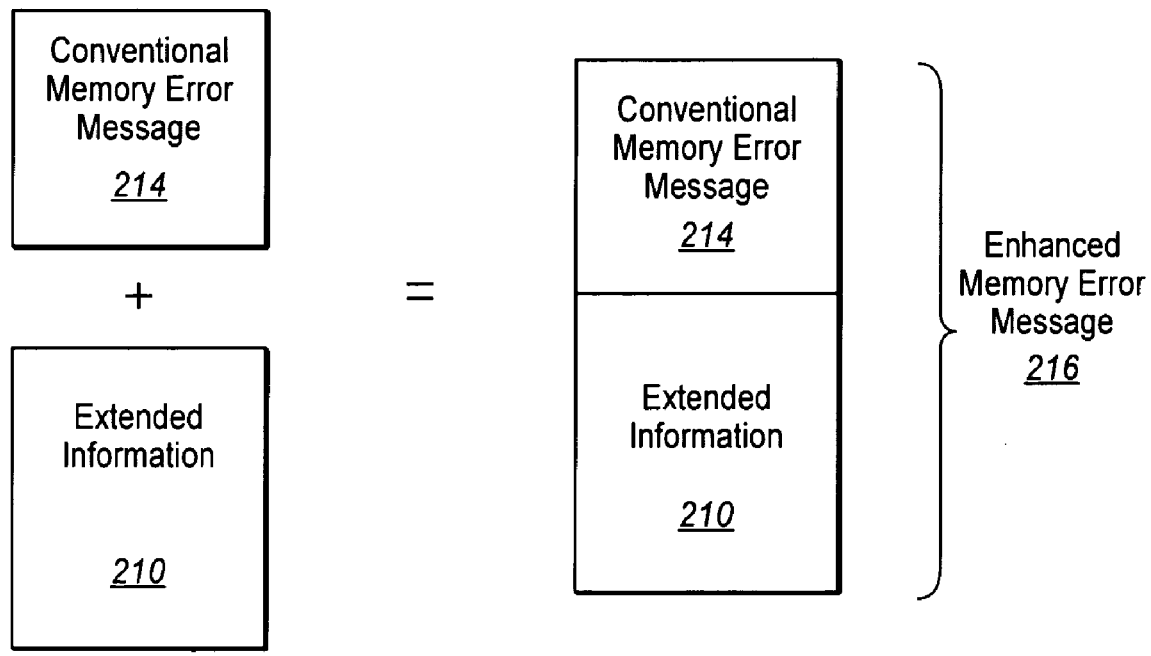

FIGS. 2A-2B illustrate an embodiment of a message enhancement mechanism 200 for memory errors. As discussed previously, a conventional memory error message for a memory error (e.g., OOME) is confusing since not enough information is provided in the conventional message that is typically associated with the error as it merely states that an error has occurred. For example, a conventional OOME message may look something like "java.lang.OutOfMemroy". This conventional message is not clear in identifying the root cause of the error or even whether the Java heap or the permanent generation is full, etc.

In one embodiment, mechanism 200 is employed to provide an enhanced memory error message 216 that includes an extended message providing essential details so that the root cause of the error can be detected. For example, an enhanced message 216, in embodiment, may appear as "Exception in thread 'main' java.lang.OutOfMemoryError: Java heap space (failed to allocate 1048592 bytes)". This exemplary enhanced message 216 clearly indicates the thread (e.g., main) that is associated with the OOME and further indicates that the OOME is associated with the Java heap space where a number of bytes (e.g., 1048592) failed to allocate. This additional information can be used by the user to know more about the thrown memory error in ways that can facilitate future prevention of such memory errors, leading to reduction in memory leaks and increase in system performance. In one embodiment, the illustrated mechanism 200 is performed at a J2EE server 220 with includes a VM (e.g., JVM) wherein the GC 218 is performed.

In one embodiment, dumps of GC history (having GC statistic) 202 and class statistic 204 are used to facilitate the generation of enhanced message 216 by first, generating extended information 210 and then, associating extended information 210 with conventional message 214. As previously described, GC history 202 having GC statistic summarizes the activities and events of GCs 218 occurring in a VM. It further indicates whether GC 218 was a full or partial GC, how long the GC 218 lasted, and the number of free bytes, etc. It further provides information about the memory trends of the system (e.g., whether the heap is growing slow or fast, in which timeframe, etc.).

Also as previously described, class statistic 204 includes a summary of the objects found in the various generations of the Java heap relating to GC 218. It further displays a number and cumulated size of the objects in specific generations of GC 218, which allows for identifying of the classes associated with objects that consume the most space. Further, class statistic 204 is used to check which classes and class loaders are still alive so that memory leaks in the permanent generation of GC 218 can be tracked down and evaluated. In one embodiment, the creating, associating, and providing of enhanced message 216 using this mechanism 200 is done in runtime (e.g., without restarting the VM at issue), which does not require any overhead, making the techniques associated with mechanism 200 useful for even those productions systems where memory errors may take weeks or even longer to surface.

In one embodiment, GC statistic module 206 is used to collect GC statistical information (GC statistic) at GC history 202 relating to GC 218 occurring at a VM at J2EE server 220. GC statistic module 206 is then used to dump GC history 202, having the GC statistical information, to generate extended information 210. Similarly, a class statistic module 208 is used to collect class statistical information (class statistic) 204 relating to GC 218. Class statistic module 208 is then used to dump class statistical 204 to generate extended information 210. Message analysis module (analysis module) 212 is then used to receive, read, and analyze extended information 210 to be associated with conventional message 214 that is thrown when a memory error (e.g., OOME) is thrown. Analysis module 212 then associates extended information 210 (including full or partial GC history 202 and class statistic 204) with conventional message 214 to generate enhanced message 216. Referring now to FIG. 2B, enhanced memory error message 216 is further illustrated. In one embodiment, extended information 210 is associated with conventional message 214 relating to a memory error to generate enhanced message 216 to provide detailed information about the memory error that is far beyond merely an indication of the memory error occurring that is provided by conventional message 214.

In one embodiment, enhanced message 216 and any other relevant data is displayed for the benefit of users via a graphical user interface (GUI) at a display device and/or stored at a database or file system for subsequent retrieval and analysis. Although, for example, a J2EE server 220, a Java VM, a Java heap, and a Java OOME are discussed for simplicity and brevity, it should be noted, however, that the underlying principles and embodiments of the present invention may be implemented within any type of object-oriented and runtime environments. Moreover, it should be noted that the memory requirements used in this example do not necessarily reflect the real values that the example program would actually produce.

In one embodiment, GC 218 may be invoked multiple times while checking the VM heap memory size, so that there are different VM implementations and, according to a relevant VM specification, a given VM implementation might not clean up the memory immediately after it has been requested to do so. Thus, to be sure that a memory cleanup is provoked, the memory size may be checked and the GC 218 may be invoked again, as necessary.

A VM (e.g., VM 100 of FIG. 1) is an example of a runtime system. A VM refers to an abstract machine that includes an instruction set, a set of registers, a stack, a heap, and a method area, such as a machine or processor. A VM essentially acts as an interface between program code and the actual processor or hardware platform on which the program code is to be executed. The program code includes instructions from the VM instruction set that manipulates the resources of the VM. The VM executes instructions on the processor or hardware platform on which the VM is running, and manipulates the resources of that processor or hardware platform, so as to effect the instructions of the program code. For example, a Java source program can be compiled into program code, such as bytecode. Bytecode can be executed on a VM, such as JVM 104, running on any processor or platform. The JVM can either interpret the bytecode one instruction at a time, or the bytecode can be further compiled for the real processor or platform using a just-in-time (JIT) compiler.

The illustrated VM 100 of FIG. 1 includes a JVM, which is used as an example; however, other examples of VMs, which can be used in various embodiments, include Advanced Business Application Programming (ABAP) language VMs, Common Language Runtime (CLR) VMs, and the like. ABAP is a programming language for developing applications for SAP systems, such as SAP R/3 system, which is a widely installed business application system developed by SAP AG of Walldorf, Germany. The CLR is a managed code execution environment developed by Microsoft Corp. of Redmond, Wash. For simplicity and brevity, the discussion in this document focuses on virtual machines, and in particular Java virtual machine 104, but it is to be understood that the techniques described herein can also be used with other types of runtime systems.

A runtime system includes a code execution environment that executes instructions or code in user requests and that provides runtime services for that code. Code runtime services may include functionality, such as process, thread, and memory management (e.g., laying out objects in the server memory, sharing objects, managing references to objects, and garbage collecting objects). Enhanced runtime services may include functionality, such as error handling and establishing security and connectivity.

Garbage collection 208 as described here includes a process designed to identify and reclaim blocks of memory that are dispensed by a memory allocator but are no longer "alive" or "live" (e.g., no longer being used, as determined, for example, by not being reachable from any currently referenced objects or entities). GC 218 can sometimes be handled as a background task by runtime systems rather than as an explicit task by user programs. GC 218 can also be handled as an inlined task. GC 218 can be used to reclaim memory in runtime systems, and there are some well-known garbage collection algorithms (e.g., reference counting, mark-sweep, mark-compact, and copying algorithms).

Figure 3A:
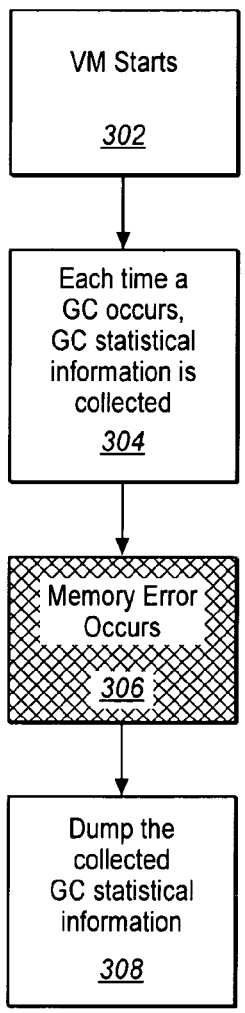
FIGS. 3A-3B illustrate an embodiment of processes for collection and dumping of garbage collection statistic and class statistic to generate an enhanced memory error message.
Figure 3B:
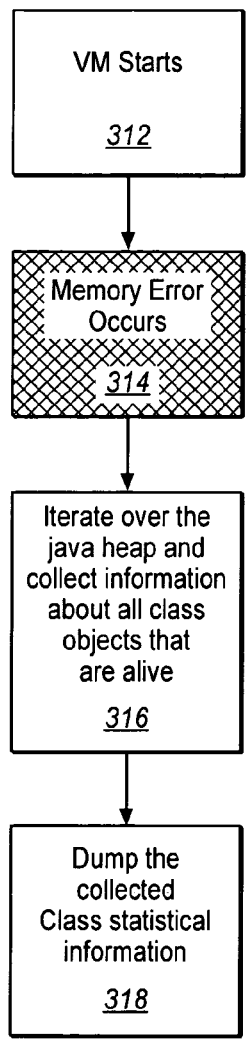

FIGS. 3A-3B illustrate an embodiment of processes for collection and dumping of garbage collection statistic and class statistic to generate an enhanced memory error message. Referring to FIG. 3A, a VM (e.g., JVM) starts at processing block 302. GCs are performed at the VM, as necessary. At processing block 304, each time a GC occurs at the VM, GC statistical information is collected. At processing block 306, a memory error (e.g., OOME) occurs. At processing block 308, the collected GC statistic is dumped to generate extended information at processing block 308. Referring now to FIG. 3B, a VM starts at processing block 312. In one embodiment, the VM is the same the VM of FIG. 3A, which includes a JVM residing at a J2EE server, where the GCs are performed and the GC statistic is collected. At processing block 314, the memory error as with FIG. 3A is thrown. At processing block 316, iteration over the Java heap is performed to collect class statistical information about class objects that are still alive at the VM, particularly after a GC. The collected class statistic is then dumped to generate the extended information at processing block 318. The extended information, which includes the dumped GC statistic and class statistic, is then used to create an enhanced message for the memory error. The enhanced message includes the extended information and conventional message associated with the memory error. In one embodiment, the enhanced message may be provided without the conventional message. For example, the conventional message may be provided separately and without having the enhanced message associated with it. In this case, the enhanced message is associated with the memory error that is thrown, but not with the conventional message corresponding to the memory error.

Figure 4:
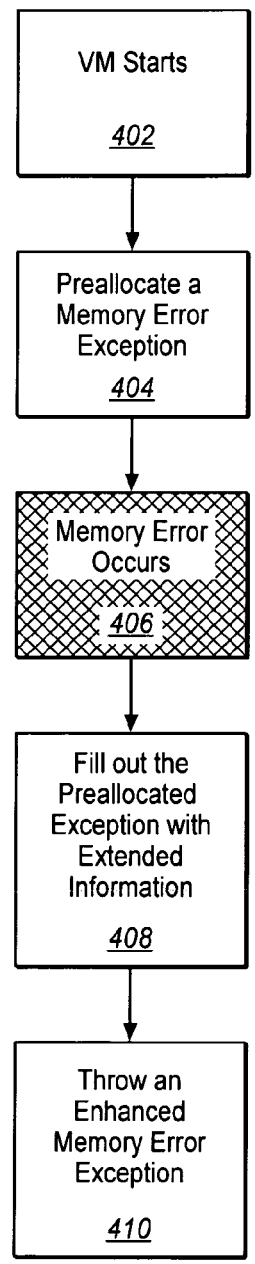
FIG. 4 illustrates an embodiment of a process to generate an enhanced memory error message.

FIG. 4 illustrates an embodiment of a process to generate an enhanced memory error message. At processing block 402, a VM (e.g., JVM) starts. At processing block 404, a memory error (e.g., OOME) is pre-allocated. The pre-allocation information that is associated with the memory error includes conventional information (conventional message) that is limited to merely an indication that the memory error has occurred. The memory error occurs at processing block 406. At processing block 408, the pre-allocated exception is filled with extended information. In other words, the extended information (having GC statistic and class statistic as, for example, referenced in FIGS. 3A-3B) is associated with the conventional message to generate an enhanced message. At processing block 410, the memory error is thrown with the enhanced message associated with it. The enhanced message including and providing the conventional message and the extended information.

The server of FIG. 1 is shown to include a J2EE server/engine/node, which supports Enterprise Java Bean ("EJB") components and EJB containers (at the business layer) and Servlets and Java Server Pages ("JSP") (at the presentation layer). The VM 100 of FIG. 1 includes a Java virtual machine. It is understood that processes taught by the discussion above can be practiced within various software environments such as, for example, object-oriented and non-object-oriented programming environments, Java based environments (such as a J2EE environment or environments defined by other releases of the Java standard), other environments (e.g., a .NET environment, a Windows/NT environment each provided by Microsoft Corporation), and the like.

Processes taught by the discussion above may be performed with program code, such as machine-executable instructions, which can cause a machine (such as a "virtual machine", a general-purpose processor disposed on a semiconductor chip, a special-purpose processor disposed on a semiconductor chip, etc.) to perform certain functions. Alternatively, these functions may be performed by specific hardware components that contain hardwired logic for performing the functions, or by any combination of programmed computer components and custom hardware components.

One or more modules, components, or elements described throughout this document, such as the ones shown within or associated with the message enhancement mechanism 200 of FIG. 2A, may include hardware, software, and/or a combination thereof. In a case where a module includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download over a communication medium via a propagated signal may be understood as providing the article of manufacture with such content described above. The code may also be downloaded from a remote computer (e.g., a server) to a requesting computer (e.g., a client) by way of data signals embodied in a propagation medium (e.g., via a communication link (e.g., a network connection)).

Figure 5:
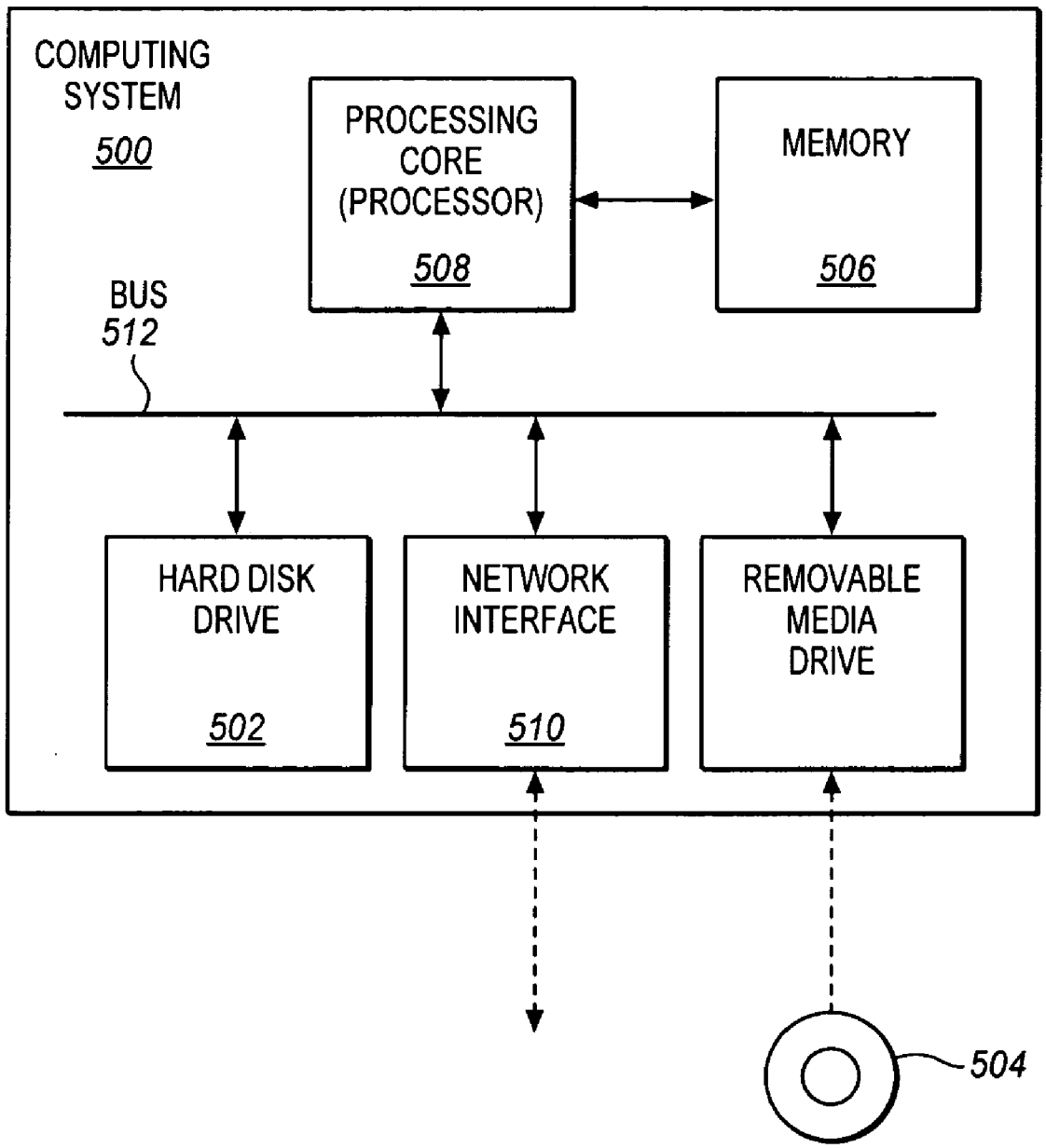
FIG. 5 illustrates an embodiment of a computing system.

FIG. 5 illustrates an embodiment of a computing system 500. Computing system 500 may be used for implementing one or more embodiments of the present invention and for executing program code stored by an article of manufacture. It is important to recognize that the computing system 500 represents merely of various computing system architectures that can be used for the same purposes. The applicable article of manufacture may include one or more fixed components (such as hard disk drive 502 or memory 506) and/or various movable components, such as compact disk (CD) ROM 504, a compact disc, a magnetic tape, and the like. To execute the program code, typically instructions of the program code are loaded into RAM 506. Then, processing core 508 executes the instructions. A processing core may include one or more processors and a memory controller function. A virtual machine or "interpreter" (e.g., JVM) may run on top of the processing core (architecturally speaking) to convert abstract code (e.g., Java bytecode) into instructions that are understandable to the specific processor(s) of processing core 508. Computing system 500 further includes network interface 510 and bus 512 to connect to other systems via a network and to have various components communicate with each other, respectively.

Figure 6:
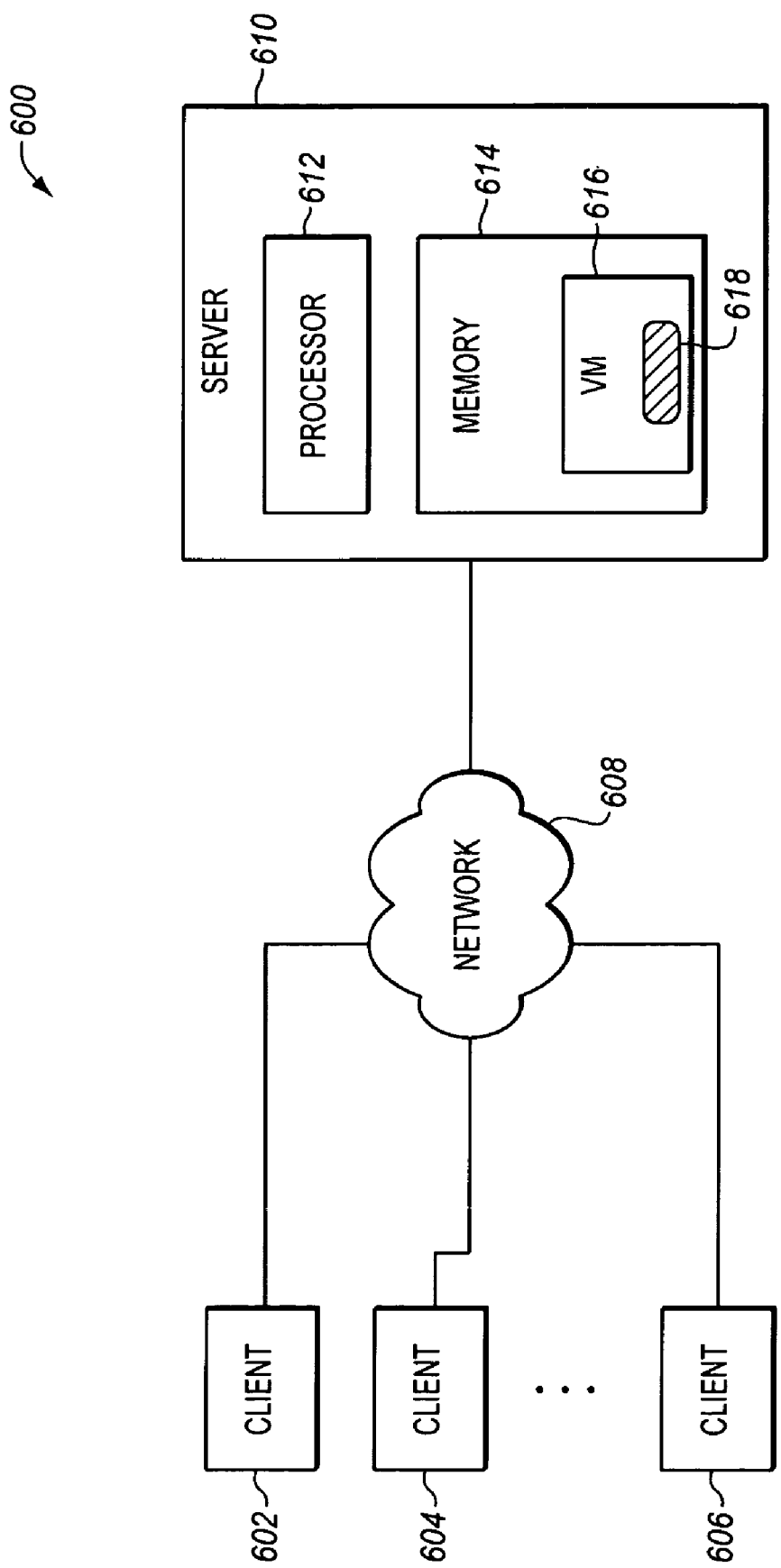
FIG. 6 illustrates an embodiment of a client/server network system employing a message enhancement mechanism.

FIG. 6 illustrates an embodiment of a client/server network system 600 employing a message enhancement mechanism 618. As illustrated, network 608 links server 610 with client systems 602-606. Server 610 includes programming data processing system suitable for implementing apparatus, programs, and/or methods in accordance with one or more embodiments of the present invention. Server 610 includes processor 612 and memory 614. Server 610 provides a core operating environment for one or more runtime systems (e.g., VM 616) at memory 614 to process user requests. Memory 614 may include a shared memory area that is accessible by multiple operating system processes executing in server 610. For example, VM 616 may include an enterprise server (e.g., a J2EE-compatible server or node, Web Application Server developed by SAP AG, WebSphere Application Server developed by IBM Corp. of Armonk, N.Y., and the like). The enterprise server at VM 616 may host a message enhancement mechanism 618. Memory 614 can be used to store an operating system, a Transmission Control Protocol/Internet Protocol (TCP/IP) stack for communicating over network 608, and machine executable instructions executed by processor 612. In some embodiments, server 610 may include multiple processors, each of which can be used to execute machine executable instructions.

Client systems 602-606 may execute multiple application or application interfaces. Each instance or application or application interface may constitute a user session. Each user session may generate one or more requests to be processed by server 610. The requests may include instructions or code to be executed on a runtime system, such as VM 616, on server 610, such as the requests made via the message enhancement mechanism 618 and its components and modules as described throughout this document.

In addition to what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
    detecting a memory error relating to a software application running at a virtual machine of an application of a server computer system;
    associating a default message to an exception associated with the memory error;
    during runtime, performing data analysis relating to the memory error to generate error analysis to be included in an extended message, the error analysis including garbage collection statistical information or class statistical information;
    enhancing the exception by associating the extended message to the exception and the default message; and
    providing the enhanced exception having the associated default and extended messages.

2. The method of claim 1, wherein the default message comprises conventional information relating to the memory error.

3. The method of claim 1, wherein performing the data analysis includes:

collecting the garbage collection statistical information by monitoring events relating to the garbage collection; and dumping the garbage collection statistical information in the extended message.

4. The method of claim 1, wherein performing the data analysis includes:

collecting the class statistical information by monitoring any objects found in multiple generations of a heap when the memory error occurs; and dumping the class statistical information in the extended message.

5. The method of claim 1, wherein the garbage collection statistical information comprises a summary of activities including one or more of garbage collection occurring at the virtual machine, indication of whether the garbage collection is full or partial, an amount of time the garbage collection lasted, and a number of free bytes.

6. The method of claim 1, wherein the class statistical information comprises a summary of one or more of a number and cumulative size of the objects, classes associated with the objects consuming memory space, living classes, living class loaders, and permanent generation-based classes and objects causing memory leaks.

7. A system comprising:

a server computer system having an application server to run software applications, the application server to detect a memory error relating to a software application running at a virtual machine of an application of a server computer system;

associate default message to an exception associated with the memory error;

during runtime, perform data analysis relating to the memory error to generate error analysis to be included in an extended message, the error analysis including garbage collection statistical information or class statistical information;

enhance the exception by associating the extended message to the exception and the default message; and providing the enhanced exception having the associated default and extended messages.

8. The system of claim 7, wherein the default message comprises conventional message relating to the memory error.

9. The system of claim 7, wherein performing the data analysis includes:

collecting the garbage collection statistical information by monitoring events relating to the garbage collection; and dumping the garbage collection statistical information in the extended message.

10. The system of claim 7, wherein performing the data analysis includes:

collecting the class statistical information by monitoring any objects found in multiple generations of the heap when the memory error occurs; and dumping the class statistical information in the extended message.

11. The system of claim 7, wherein the garbage collection statistical information comprises a summary of activities including one or more of garbage collection occurring at the virtual machine, indication of whether the garbage collection is full or partial, an amount of time the garbage collection lasted, and a number of free bytes.

12. The system of claim 7, wherein the class statistical information comprises a summary of one or more of a number and cumulative size of the objects, classes associated with the objects consuming memory space, living classes, living class loaders, and permanent generation-based classes and objects causing memory leaks.

13. A machine-readable storage medium comprising instructions which, when executed, cause a machine to:

detect a memory error relating to a software application running at a virtual machine of an application of a server computer system;

associate a default message to an exception associated with the memory error;

during runtime, perform data analysis relating to the memory error to generate error analysis to be included in an extended message, the error analysis including garbage collection statistical information or class statistical information;

enhance the exception by associating the extended message to the exception and the default message; and provide the enhanced exception having the associated default and extended messages.

14. The machine-readable storage medium of claim 13, wherein the default message comprises conventional information relating to the memory error.

15. The machine-readable storage medium of claim 13, wherein the instructions when executed to perform the data analysis, further cause the machine to:

collect the garbage collection statistical information by monitoring events relating to the garbage collection; and dump the garbage collection statistical information in the extended message.

16. The machine-readable storage medium of claim 13, wherein the instructions when executed to perform the data analysis, further cause the machine to:

collect the class statistical information by monitoring any objects found in multiple generations of a heap when the memory error occurs; and dump the class statistical information in the extended message.

17. The machine-readable storage medium of claim 13, wherein the garbage collection statistical information comprises a summary of activities including one or more of garbage collection occurring at the virtual machine, indication of whether the garbage collection is full or partial, an amount of time the garbage collection lasted, and a number of free bytes.

18. The machine-readable storage medium of claim 13, wherein the class statistical information comprises a summary of one or more of a number and cumulative size of the objects, classes associated with the objects consuming memory space, living classes, living class loaders, and permanent generation-based classes and objects causing memory leaks.

* * * * *